UNITED STATES PATENT OFFICE.

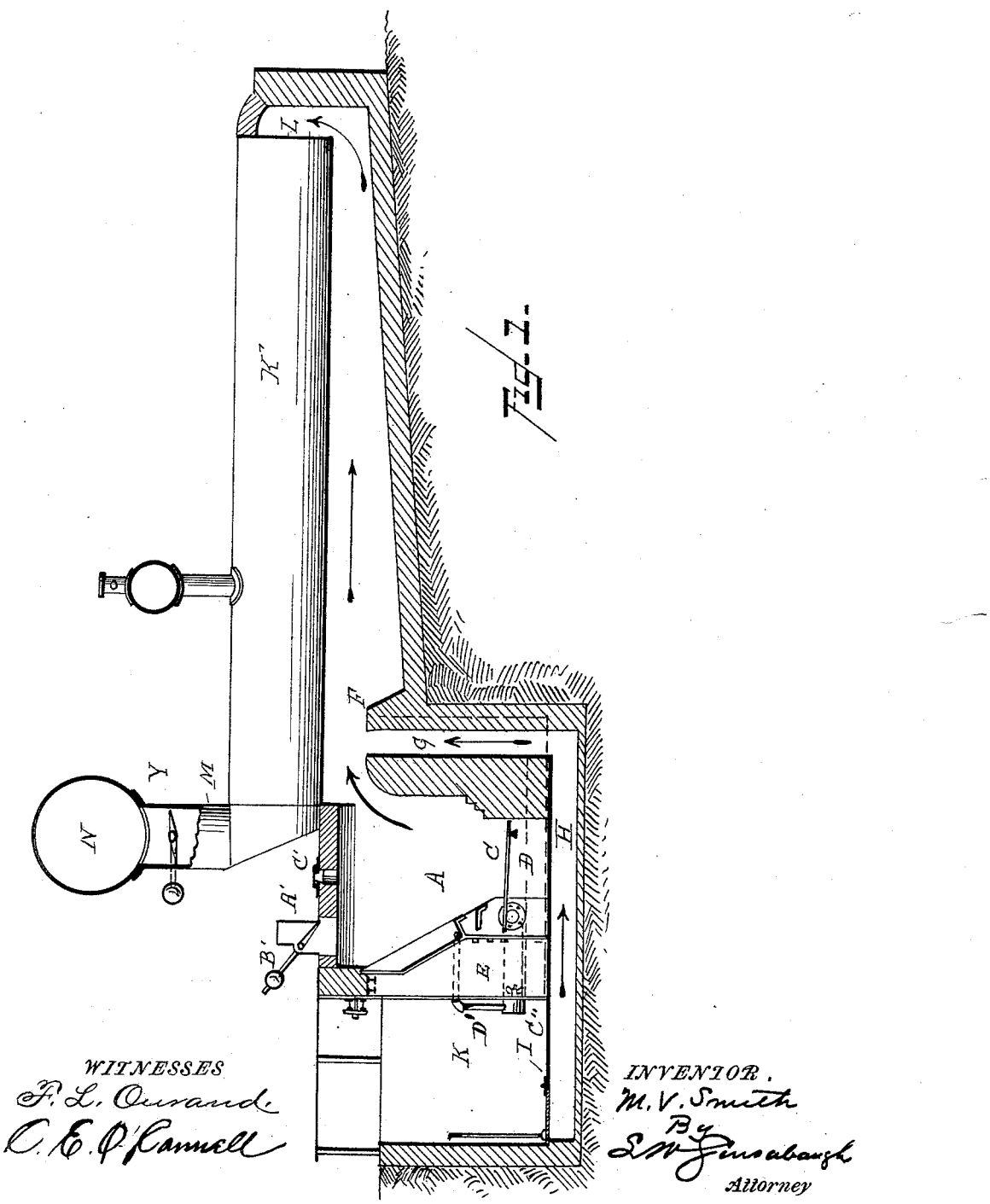

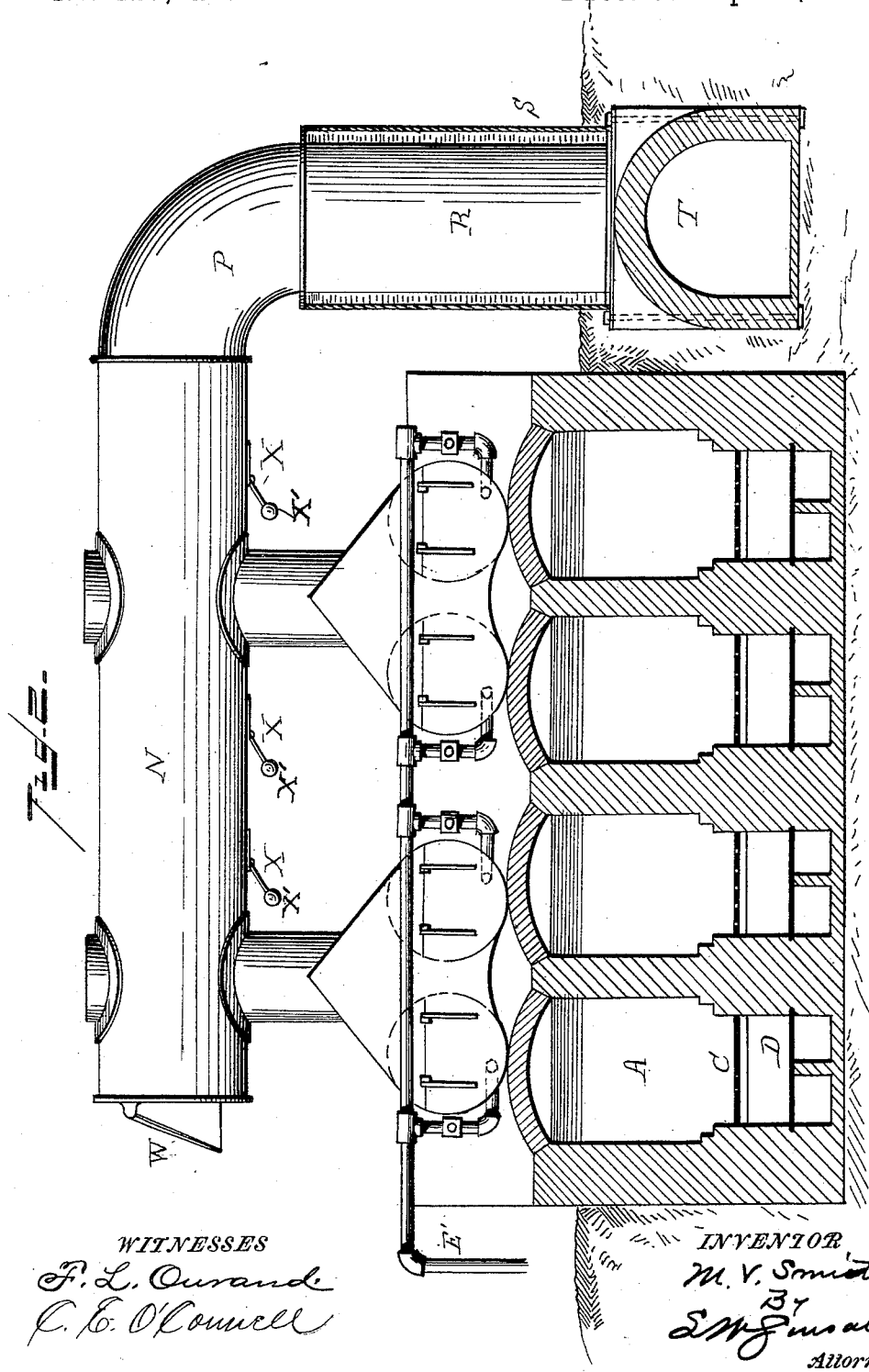

MARTIN V. SMITH, OF PITTSBURG, PENNSYLVANIA, ASSIGNOR TO THE PITTSBURGH METALLURGY COMPANY, OF SAME PLACE.

METHOD OF BURNING FUEL AND UTILIZING THE HEAT AND GASES.

SPECIFICATION forming part of Letters Patent No. 424,828, dated April 1, 1890.

Application filed July 8, 1889. Serial No. 316,866. (No model.)

*To all whom it may concern:*

Be it known that I, MARTIN V. SMITH, a citizen of the United States, residing at Pittsburg, in the county of Allegheny and State of Pennsylvania, have invented new and useful Improvements in the Method of Burning Fuel and Utilizing the Heat and Gases Generated Thereby; and I do hereby declare the following to be a full, clear, and exact description of said invention, reference being had to the accompanying drawings, and to the letters of reference marked thereon, which form a part of this specification.

This invention relates to an improved method of burning fuel and utilizing the heat and gases generated thereby; and it has for its objects, first, to utilize the heat of the hot gases resulting for the mutual decomposition of air and steam in connection with incandescent carbonaceous material; second, to provide for intensifying heat of said gases by partly consuming the same, and, third, to provide for the ultimate use of the combustible gases after being partially consumed by precipitating the hydrogen to separate it from the gases prior to the final use of said gases, as hereinafter set forth.

In practicing my invention ignited coke or other carbonaceous material is subjected to the action of a blast of air until the whole body is rendered incandescent. Then a current or series of jets of steam, in connection with an induced blast of air, is passed through the incandescent mass of carbonaceous material, producing a large volume of intensely-heated combustible gases, consisting mainly of hydrogen and carbonic oxide, mixed, however, with carbonic acid and the nitrogen of the air introduced, which act simply as diluents of the combustible gases. These hot gases may be employed as heating agents for various purposes—for instance, in connection with boiler-furnaces for the generation of steam, where the heat necessary for the development of the gases and contained in said gases as they are produced may be imparted to the water in the boiler to heat the same.

Any suitable apparatus may be employed in carrying out my invention in which the hot generated gases may be employed to give up their heat for the generation of steam or for other purposes, and in which the gases generated resulting from the mutual decomposition of air and steam in connection with incandescent carbonaceous material may be subsequently partially oxidized or burned, and the resultant gases cooled to a degree of temperature sufficient to condense the steam and then passing the cooled and condensed gases to a place of storage or consumption. I prefer, however, to employ the apparatus illustrated in the accompanying drawings.

In the said drawings, Figure 1 represents a longitudinal vertical sectional view of a furnace adapted to carry my invention into effect; and Fig. 2, a cross-section of the furnace and boilers, the eduction-flues through which the unconsumed gases pass off, the condenser wherein the oxidized hydrogen is separated, and the main through which the final gases are passed off to the point of consumption or storage.

The letter A indicates a producer or generating-chamber of a furnace. The said furnace is provided with the usual grate C, ash-pit D, and draft-doors E, through which air is supplied initially to support combustion of the fuel.

The letter F indicates the fire-bridge of the furnace, which is provided with a vertical flue G, leading from the horizontal flues H, which communicate by means of openings I with the working-pit K of the plant, through which air may be supplied to the gases passing from the producer.

The letters K' indicate ordinary return-flue boilers located over the rear of the furnace above and back of the fire-bridge. The flues of the said boiler at the rear ends communicate with the rear of the furnace by means of the vertical flues L, and at the fronts of the boilers, connecting with the flues thereof, are arranged pipes or flues M, which connect with an eduction-flue N, through which the unconsumed gases escape. The said pipe N connects by an an elbow-pipe P with a vertical flue R, which is surrounded by a water-jacket S, through which a stream of water may be kept flowing in any suitable manner, in order to cool the gases passing off to a temperature below 212° Fahrenheit and condense the water resulting from the oxidation of the hydrogen to separate it from the gases. The lower end of the flue R connects with the main T, through which the unconsumed gases are finally passed off for use.

In the vertical pipe M are located dampers Y, by means of which the connection between the flues of the boilers and the eduction-flue may be opened or closed at will.

The front end of the eduction-flue N is provided with a puff-valve W, Fig. 2, and at intermediate points the flue is also provided with puff-valves X, having weighted levers X', which permit them to open automatically upon any sudden puff or extra pressure of gas and close automatically upon the relief of the pressure.

Each furnace at its top above the producer is provided with a fuel-conduit A', having a balance-damper B', by means of which fuel may be supplied when required. The top of the furnace is also provided with a stoke-hole C', through which the fuel may be manipulated by means of a suitable bar. Through the front of each of the furnaces, below the grate-bars thereof, extends a pipe or flue C'', which connects at its outer end with the external air and terminates at its inner end within the furnace below the grate thereof. Into the outer end of the said pipe or flue C'' extends a steam-injector or series of steam-injectors D', which receive a supply of steam through the pipes E', leading from the boiler, so as to permit a regulated supply of steam to be discharged into the furnace under the grate thereof, as and for the purpose more fully hereinafter explained.

The operation of my invention is as follows: The boiler is filled with water to or above the usual fire-line and the producer or generator is suitably charged with coke or other suitable carbonaceous material. The fuel is then ignited, the draft-door being opened to admit the air for the support of the combustion of the fuel. The air thus admitted passes up through the coke, the products of combustion passing back under the boiler through the flues in the boiler, automatically opening the puff-doors and escaping. When the coke becomes thoroughly incandescent, the draft-doors are closed and steam is admitted through the jet-pipes which enter the flue, the jet inducing a current of air which is carried into the furnace below the grate-bars, and with the steam passes up through the incandescent fuel in the producer.

Fresh coal may now be added through the hopper E. If it is desired to take the products of combustion from under the boiler, together with the unconsumed or unoxidized gases, the puff-door W is closed and the gas passed through tube N and condenser R into the main T, leading the final gases to their place of storage or consumption.

By means of the improved boiler-furnace above described it will be readily understood that the heat initially used in producing the gas is utilized in the generation of steam, but that any additional degree of heat may be supplied to the boiler and all unconsumed gases saved and used subsequently.

As the producer-gas expands to double its volume for every 500° of heat, it follows that one volume of gas at ordinary atmospheric temperature would expand to four volumes at 2,000° of heat. It will be readily perceived, therefore, that by cooling the gases the water is not only condensed and separated, but the gases are also condensed, so as to render one cubic foot of cold gas equal to four feet of the expanded gas in heating capacity, while reducing the storage capacity necessary when keeping the gas to a similar degree.

In an application filed of even date herewith, Serial No. 316,867, I have claimed the apparatus shown in this application, and such I do not claim here.

Having thus described my invention, what I claim, and desire to secure by Letters Patent, is—

The method herein described of utilizing the gases generated from a carbonaceous material, consisting in igniting the same, passing a current or jet of air and steam through the ignited mass to generate a rich producer-gas of hydrogen and carbonaceous oxide, admitting air to the gases in a combustion-chamber to mingle with the gases to oxidize and partially consume the same to generate steam, and then cooling the resultant gases and products of combustion to condense and eliminate the steam and reduce the volume of gases, and finally passing the cooled and condensed gases to a place of consumption, as set forth.

In testimony whereof I affix my signature in the presence of two subscribing witnesses.

MARTIN V. SMITH.

Witnesses:
 JOS. P. EGAN,
 ARTHUR VON SENDEN.